Patented Apr. 10, 1951

2,548,037

UNITED STATES PATENT OFFICE 2,548,037

PROCESS OF RECOVERING LITHIUM VALUES FROM DILITHIUM SODIUM PHOSPHATE

Leonard John Minnick, Cheltenham, and Charles Raymond Brown, Llanerch, Pa., assignors to G. and W. H. Corson, Inc., Plymouth Meeting, Pa., a corporation of Delaware No Drawing. Application April 30, 1946, Serial No. 666,187

8 Claims. (Cl. 23—33)

The present invention relates to a process for the recovery of the lithium values in usable form from a complex lithium compound; and more particularly, the invention relates to a process for the treatment of dilithium sodium phosphate by which process the lithium values may be obtained as a simple water-soluble salt.

Lithium is often found associated with another alkali metal in various complex compounds and the recovery of the lithium values therefrom has presented a problem due in part to the fact that, in an attempt to convert the lithium values into a soluble compound, the other alkali metal has likewise been converted into a soluble compound and the separation of the soluble lithium compound from the other soluble alkali metal compound is very difficult and laborious. In the processing of various brines, complex lithium compounds containing other alkali metals are or may be formed. For example, at the present time, dilithium sodium phosphate ($Li_2NaPO_4$) is a lithium-containing salt obtainable as the tail salt of the evaporator liquors of the products recovery plant at Searles Lake, California.

One object of the present invention is to provide a method by which the lithium values of a complex lithium compound may be economically recovered.

Another object is to provide a relatively simple method for the substantially quantitative separation of the lithium in the form of a usable water-soluble salt from dilithium sodium phosphate which salt may then be advantageously used in the various industries or may be converted into lithium metal by an appropriate procedure.

A further object is to provide a method which affords a means for separating the lithium values from dilithium sodium phosphate, and particularly a method which, in addition, produces a valuable by-product in the form of a phosphate having commercial utility.

Other objects will be apparent from a consideration of this specification and the claims.

In accordance with the process of the present invention, the dilithium sodium phosphate is treated in aqueous medium, under the conditions hereinafter described, with a hydroxide which selectively releases the sodium present in the dilithium sodium phosphate to form sodium hydroxide and a substantially insoluble lithium-containing phosphate in which the cation of the hydroxide has replaced the sodium of the dilithium sodium phosphate. The insoluble complex phosphate formed is separated from the solution of the sodium hydroxide and thus there is provided a lithium-containing compound which may be further treated to remove the lithium values therefrom without danger of contamination thereof with other alkali metal compounds. In the preferred process as hereinafter described, the lithium-containing phosphate is reacted in an aqueous medium with a compound to convert it into a soluble lithium salt and an insoluble phosphate. The soluble lithium salt is then separated from the insoluble phosphate and the resulting solution may be evaporated to obtain a concentrated solution of the lithium salt or the salt in crystalline form or it may be used as a source for the preparation of lithium compounds by chemical precipitation.

In the first step of the process in which the sodium of the dilithium sodium phosphate is replaced by another metal, the compound employed to obtain this interchange is a hydroxide which provides, as the result of reaction, a substantially insoluble lithium-containing phosphate and sodium hydroxide and which releases from the dilithium sodium phosphate only sodium leaving substantially unaffected the lithium in the dilithium sodium phosphate. The hydroxide reacted with the dilithium sodium phosphate will possess solubility in the reaction medium, and the metal cation thereof will be capable of existing in the polyvalent state. Such a hydroxide is more soluble in the reaction mixture than the lithium-containing phosphate obtained as the result of the reaction, the said lithium-containing phosphate being substantially insoluble in the reaction medium.

The reaction between the hydroxide of a metal capable of existing in the polyvalent state and the dilithium sodium phosphate results in a substantially insoluble lithium-containing phosphate free from sodium and sodium hydroxide in solution in the reaction medium. The use of such a hydroxide is to be contrasted to the use of the corresponding salt which would displace, not only the sodium, but also lithium from the dilithium sodium phosphate. The choice of the hydroxide will depend upon the type of insoluble phosphate desired as one of the end products obtained when the lithium-containing phosphate first obtained is subsequently treated to produce a soluble lithium salt, due to the fact that the cation of the hydroxide reacted with the dilithium sodium phosphate will be present in that insoluble end-product. The hydroxide is preferably a polyvalent hydroxide and in one preferred embodiment is an alkaline earth hydroxide, i. e., calcium, strontium, barium, or magnesium hydroxide, the use of calcium oxide being especially advantageous in many instances. When other hydroxides such as zinc, aluminum, iron, nickel, and cobalt are used, it may be advantageous to increase the solubility thereof by adding caustic soda, ammonia, other alkali or other solubilizing compound, such as a non-aqueous solvent, for example, ethyl or isopropyl alcohol or diethyleneglycol, to the reacting mixture, it being understood that the resulting solubility is greater than the solubility, in the reacting medium, of the lithium-containing phosphate obtained as the result of the reaction. If desired, more than one hydroxide may be reacted with the dilithium sodium phosphate in which case a mixture of substantially insoluble lithium-containing phosphates is obtained. It is to be understood that an oxide capable of forming the hydroxide, rather than the hydroxide itself, may be mixed with the dilithium sodium phosphate and the aqueous medium, but, since under the conditions of the reaction, the oxide will, for the most part at least, be converted into the hydroxide, reference herein to the use of the hydroxide includes the mixing of the oxide with the dilithium sodium hydroxide and the aqueous medium.

In replacing the sodium of the dilithium sodium phosphate by another metal to form a substantially insoluble lithium-containing phosphate free from sodium, the dilithium sodium phosphate and the hydroxide furnishing the new metal are mixed in an aqueous medium and the resulting mixture is placed in an autoclave and subjected to a temperature above 212° F. and a pressure above atmospheric until the desired metal interchange is completed. The amount of water is not important so long as there is sufficient to permit the reaction to take place in the presence of water in the liquid phase. The important feature of this step is the removal from the dilithium sodium phosphate of all or of substantially all of the sodium therein without any significant displacement of the lithium from the compound. In order to obtain substantially complete removal of the sodium from the dilithium sodium phosphate, the hydroxide furnishing the metal displacing the sodium is employed in an amount at least equivalent to the sodium to be displaced. An excess of the hydroxide will not interfere with the reaction and a slight excess is often desirable to insure completion of the reaction. An appreciable excess, however, is not recommended since it represents a loss of material and may contaminate the solution, or even the insoluble lithium-containing phosphate if the reacting hydroxide is present in a sufficient excess so that a part thereof is not in solution. While the hydroxide employed is sufficiently soluble in the reaction medium to bring about the reaction, the solubility thereof is oftentimes limited so that at the start of the reaction, the reacting medium may contain the hydroxide in suspension in a saturated solution thereof. As the reaction proceeds, the suspended hydroxide dissolves so that, at the completion of the reaction, all that is involved in the reaction has been dissolved in the reaction medium. Such a hydroxide is referred to herein as a hydroxide "possessing solubility in the reaction medium."

The temperature employed depends upon the time available for the reaction and the type of autoclave used. Generally, in order to obtain the reaction in a reasonable time, a temperature corresponding at least to a steam pressure of 50 pounds per square inch will be employed, although temperatures corresponding to steam pressures of 10 to 20 pounds per square inch or even less may be used if desired. The upper limit of temperature is only governed by the equipment and may be as high as that corresponding to 800 pounds per square inch or higher. At a temperature corresponding to a steam pressure of about 100 pounds per square inch, the reaction can be completed in one-half to one hour, whereas at a temperature corresponding to a steam pressure of 600 or 700 pounds per square inch, the time required for the reaction will be only a few minutes. In the preferred embodiment of the invention, a temperature corresponding to a steam pressure of at least about 100 pounds per square inch, for example, from about 100 to 200 pounds per square inch, is employed.

After the completion of the reaction, the insoluble lithium-containing phosphate is separated from the solution containing the sodium hydroxide by any suitable mechanical expedient, for example by filtration, by centrifuge, or by other device. The solution of the sodium hydroxide, is a valuable by-product which may be used as such or may be treated to recover the hydroxide therefrom.

The insoluble lithium-containing phosphate containing the exchanged metal is advantageouly further reacted in an aqueous medium to convert the lithium into a salt soluble in the medium and to produce an insoluble product. It will, therefore, be seen that, in this reaction, the lithium of the lithium-containing phosphate is replaced by another metal and that the other metal forms with the remainder of the lithium-containing phosphate an insoluble product. This reaction is brought about by a salt possessing solubility in reaction medium, the metal of which is capable of existing in the polyvalent state. When such a salt is used, the salt is more soluble in the reaction medium than the resulting reaction product, the reaction product being substantially insoluble in the reaction medium.

The choice of the salt employed will depend upon the lithium compound desired since the anion of the salt will determine the particular lithium salt obtained, and upon the type of insoluble product desired since this product will contain the cation of the salt reacted. In this reaction, the use of an alkaline earth salt is usually preferred, a calcium salt being especially advantageous. Examples of the alkaline earth salts available for use are the calcium, magnesium, strontium, and barium chlorides, nitrates, perchlorates, acetates, and other organic salts and the like and calcium and magnesium sulphate. If desired, the salts of other metals, preferably in the polyvalent state, such as zinc, aluminum, iron, zirconium, nickel, and cobalt may be used. It may be advantageous to include in the reaction medium a solubilizing agent such as an acid or a non-equeous solvent, for example, ethyl or isopropyl alcohol, or diethyleneglycol. In the case an acid is used, the acid after the reaction may be neutralized by the addition of lithium hydroxide. If desired, more than one salt may be reacted with the insoluble lithium-containing phosphate, in which case a mixture of insoluble compounds will result, and if salts of different anions are employed, a solution containing a mixture of soluble lithium salts will be obtained.

In the case of salts which are relatively soluble in the reacting medium, it is not necessary to use an autoclave to obtain an elevated temperature corresponding to superatmospheric pressure, but when a relatively insoluble salt is used, for example calcium sulphate, the use of an autoclave is recommended. The temperature of reaction will, therefore, depend on the salt employed and with relatively soluble salts the desired reaction may be obtained by digesting the reactants at 212° F. or lower for several hours, and, in certain instances, the digestion may be carried out at a very moderate temperature, for example room temperature. It is often convenient in order to shorten the time of reaction and to insure completion thereof to digest the reactants at a temperature of at least 150° F. However, even in the case of such salts, the reaction time may be materially reduced if the reaction is conducted in an autoclave at a temperature corresponding to a steam pressure of 50 pounds per square inch. If desired, however, the temperature may correspond to a steam pressure of 10 to 20 pounds per square inch or even lower and the upper limit of pressure is governed by the equipment and may be as high as that corresponding to 800 pounds per square inch or higher. Usually, in the case of relatively insoluble salts, a temperature corresponding to a steam pressure of from about 100 to 200 pounds per square inch will be used.

In this step, the production of a solution of a lithium salt substantially free from impurities is desirable and it is not essential that the reaction go to substantial completion, since any unconverted lithium will remain insoluble and will be removed with the insoluble material. In order to insure freedom of contamination of the solution of the lithium salt, the amount of reacting salt added may advantageously be slightly less than that required for the complete reaction. It is to be understood, however, that an excess of the reacting salt may be used if for any reason this is desirable.

The products of reaction obtained in this step are treated in a manner similar to that described above in connection with the first metal exchange step, that is the insoluble phosphate is removed by suitable means from the solution which in this case contains the soluble lithium salt. After the separation of the insoluble material from the solution, each product can be further treated as desired to place it in a form suitable for subsequent use or marketing. Thus, the lithium salt solution can be concentrated in evaporators and the lithium salt obtained in crystalline form or it may be used as a source for the preparation of lithium compounds by chemical precipitation. The lithium salt may subsequently be brought to the anhydrous condition by any suitable procedure. The insoluble product, if marketable, may be dried to a cake or powder and bagged.

From the foregoing description, it is to be noted that in accordance with the process of this invention, the dilithium sodium phosphate treated is converted into a lithium-containing phosphate which is substantially free from sodium. This selective displacement of the undesired sodium which takes place without significant solubilization of the lithium is truly an advance over other processes in which the lithium, as well as the other alkali metal is rendered soluble and this step in itself is a feature of the present invention. In the preferred complete process, the insoluble lithium-containing phosphate is converted into a soluble lithium salt and an insoluble phosphate. The purity of the lithium salt solution is dependent on the quantitative removal of the sodium from the lithium-containing phosphate formed in the first reaction and on the insolubility of the by-product in the second reaction.

Dilithium sodium phosphate is an ideal source for the production of lithium and lithium compounds since it has several advantages over other lithium sources. For example, dilithium sodium phosphate as obtained from the Searles Lake plant is constant in composition, has a high degree of purity, and contains a higher percentage of lithium values (about 22% calculated as lithium oxide) than is available in other sources. For these reasons, its treatment will be further discussed and illustrated in the specific examples.

When dilithium sodium phosphate is treated with a hydroxide, such as calcium hydroxide, the following equation is illustrative:

$$2Li_2NaPO_4 + Ca(OH)_2 \rightarrow Li_4Ca(PO_4)_2 + 2NaOH$$

When the $Li_4Ca(PO_4)_2$ is subsequently reacted with a salt such as calcium chloride, the following equation is illustrative:

$$Li_4Ca(PO_4)_2 + 2CaCl_2 \rightarrow 4LiCl + Ca_3(PO_4)_2$$

It will be seen from the above that if trimagnesium phosphate or a phosphate of another metal is desired, magnesium hydroxide and magnesium chloride or other salt will be used. Likewise, if a mixed phosphate is desired such as dicalcium magnesium phosphate or dimagnesium calcium phosphate, the appropriate hydroxide or salt will be reacted. Similarly, if instead of lithium chloride, lithium sulphate or lithium perchlorate, for example, is desired, then calcium, magnesium, or other sulphate or perchlorate will be employed in the second metal exchange step.

The following examples are illustrative of the present invention:

To 2,000 pounds of $Li_2NaPO_4$ in approximately 200 gallons of water, there is added 560 pounds of high calcium hydrated lime. This mixture is then subjected to a temperature corresponding to a steam pressure of 100 pounds per square inch in an autoclave for one hour. The resultant slurry contains 1,954 pounds of $Li_4Ca(PO_4)_2$ in suspension and 606 pounds of sodium hydroxide in solution. The sodium hydroxide is removed from the insoluble phosphate by filtration followed by a water wash of the insoluble material. The insoluble double salt is then reacted in the presence of 200 gallons of water with 1,680 pounds of calcium chloride in an autoclave for thirty minutes at a temperature corresponding to 50 pounds per square inch. The slurry removed from this digestion process contains 2,350 pounds of $Ca_3(PO_4)_2$ in suspension and 1,280 pounds of LiCl in solution. The insoluble phosphate is removed from the solution by filtration and the insoluble material is washed with water. The wet calcium phosphate on removal from the filter is dried in a conventional drier to produce a commercial product. The solution containing LiCl is further processed by conventional means to produce very pure lithium chloride in the desired form.

In another example, the same procedure is followed except that magnesium sulphate is used in the second ion exchange reaction in an amount equivalent to the calcium chloride of the preceding example and dimagnesium calcium phosphate and lithium sulphate are obtained as end products.

In a further example, the Li₄Ca(PO₄)₂ produced by the first step as above described is reacted with calcium perchlorate in an amount equivalent to the calcium chloride to form tricalcium phosphate in suspension and lithium perchlorate in solution. The calcium perchlorate may be advantageously obtained by treating the anolyte described in copending application Serial No. 672,704 filed May 27, 1946, which contains ammonium perchlorate, with hydrated lime. The lithium perchlorate may be further processed to produce a dry salt for re-use in the cell as described in said copending application.

Considerable modification is possible in the selection of the compounds reacted in the first and second ion exchange reactions described herein, as well as in the various factors involved in the steps of the process, without departing from the essential features of the present invention.

We claim:

1. The steps in the process of recovering lithium values from dilithium sodium phosphate which comprise subjecting, in an aqueous medium, said dilithium sodium phosphate and a hydroxide possessing solubility in said aqueous medium, the metal of which is in the polyvalent state, to a temperature above 212° F. and a pressure above atmospheric to produce a lithium-containing phosphate, substantially insoluble in said aqueous medium, in which the sodium of said dilithium sodium phosphate has been replaced by the metal of said hydroxide reacted therewith, and sodium hydroxide; and separating said insoluble lithium-containing phosphate from the solution of the sodium hydroxide.

2. The steps of claim 1 wherein the compound reacted with the dilithium sodium phosphate is an alkaline earth metal hydroxide; and wherein the temperature employed in the reaction is at least a temperature corresponding to a steam pressure of about 50 pounds per square inch.

3. The steps of claim 1 wherein the compound reacted with the dilithium sodium phosphate is calcium hydroxide; and wherein the temperature employed in the reaction is at least a temperature corresponding to a steam pressure of about 100 pounds per square inch.

4. The process of recovering lithium values from dilithium sodium phosphate which comprises subjecting, in an aqueous medium, said dilithium sodium phosphate and a hydroxide possessing solubility in the reaction medium, the metal of which is in the polyvalent state, to a temperature above 212° F. and a pressure above atmospheric to produce a lithium-containing phosphate, substantially insoluble in said aqueous medium, in which the sodium of said dilithium sodium phosphate has been replaced by the metal of said hydroxide reacted therewith, and sodium hydroxide; separating said insoluble lithium-containing phosphate from the solution of the sodium hydroxide; reacting said lithium-containing phosphate in an aqueous medium with a salt possessing solubility in said aqueous medium, the metal of which is in the polyvalent state to produce a water-soluble lithium salt and a substantially insoluble phosphate in which the lithium of said lithium-containing phosphate has been replaced by the metal of said salt; and separating said insoluble phosphate from the solution of the lithium salt.

5. The process of claim 4 wherein the dilithium sodium phosphate is reacted in the first reaction at a temperature of at least that corresponding to a steam pressure of about 50 pounds per square inch; and wherein the lithium-containing phosphate obtained in the first reaction after separation from the solution of the sodium hydroxide is reacted at a temperature of at least that corresponding to a steam pressure of about 50 pounds per square inch.

6. The process of claim 4 wherein the compound reacted with the dilithium sodium phosphate in the first reaction is an alkaline earth metal hydroxide.

7. The process of claim 4 wherein the compound reacted with the dilithium sodium phosphate in the first reaction is an alkaline earth metal hydroxide; wherein the dilithium sodium phosphate is reacted with the alkaline earth metal hydroxide at a temperature of at least that corresponding to a steam pressure of about 50 pounds per square inch; and wherein the salt reacted with the insoluble lithium-containing phosphate obtained in the first reaction is an alkaline earth metal salt.

8. The process of claim 4 wherein the compound reacted with the dilithium sodium phosphate is calcium hydroxide; wherein the dilithium sodium phosphate is reacted with calcium hydroxide at a temperature of at least that corresponding to a steam pressure of about 100 pounds per square inch; and wherein the salt reacted with the insoluble phosphate obtained in the first reaction is a calcium salt.

LEONARD JOHN MINNICK.
CHARLES RAYMOND BROWN.

REFERENCES CITED

The following references are of record in the file of this patent:

UNITED STATES PATENTS

| Number | Name | Date |
|---|---|---|
| 2,021,988 | Corson et al. | Nov. 26, 1935 |
| 2,413,644 | Nicholson | Dec. 31, 1946 |

OTHER REFERENCES

Mellor: "Comprehensive Treatise on Inorganic and Theoretical Chemistry," vol. 2, 1922, pages 862, 879–80.